United States Patent [19]

Schell

[11] 4,134,742
[45] Jan. 16, 1979

[54] GAS SEPARATION MEMBRANES

[75] Inventor: William J. Schell, Long Beach, Calif.

[73] Assignee: Envirogenic Systems Company, El Monte, Calif.

[21] Appl. No.: 803,638

[22] Filed: Jun. 6, 1977

[51] Int. Cl.² .................... B01D 13/00; B01D 53/22
[52] U.S. Cl. .................................. 55/16; 55/158; 210/490
[58] Field of Search .................. 55/16, 158; 210/489, 210/490, 491, 500 M; 264/41, 217, 230

[56] References Cited

U.S. PATENT DOCUMENTS

| 3,397,790 | 8/1968 | Newby et al. ................ 55/158 X |
| 3,565,981 | 2/1971 | Lauro ........................... 264/41 X |
| 3,592,672 | 7/1971 | Rowley et al. ............ 210/500 M X |
| 3,872,014 | 3/1975 | Schell .......................... 55/158 X |
| 3,914,479 | 10/1975 | Yamagata et al. ............ 264/41 X |
| 3,948,781 | 4/1976 | Brun et al. ................... 210/500 M |
| 3,950,255 | 4/1976 | Ishii et al. .................. 210/500 M X |
| 3,984,328 | 10/1976 | Brun et al. ................. 210/500 M X |
| 3,993,566 | 11/1976 | Goldberg et al. .......... 210/500 M X |

Primary Examiner—Robert H. Spitzer
Attorney, Agent, or Firm—Marvin E. Jacobs

[57] ABSTRACT

A dry, fabric supported, polymeric gas separation membrane, such as cellulose acetate, is prepared by casting a solution of the polymer onto a shrinkable fabric preferably formed of synthetic polymers such as polyester or polyamide filaments before washing, stretching or calendering (so called griege goods). The supported membrane is then subjected to gelling, annealing, and drying by solvent exchange. During the processing steps, both the fabric support and the membrane shrink a preselected, controlled amount which prevents curling, wrinkling or cracking of the membrane in flat form or when spirally wound into a gas separation element.

10 Claims, 3 Drawing Figures

GAS SEPARATION MEMBRANES

BACKGROUND OF THE INVENTION

1. Field of the Invention

The present invention relates to gas separation membranes, and, more particularly, to a composite gas separation membrane including synthetic, cellulose acetate membrane supported on a synthetic polymeric fabric.

2. Description of the Prior Art

It has been recognized for many years that non-porous polymer films exhibit a higher permeability toward some gases than towards others. As early as 1831, investigations were reported on the phenomenon of enrichment of air with rubber membranes; however, not until 1950 had the practical possibility of this and other gas separations with permselective membranes been seriously studied. Weller and Steiner in their classic papers, (*J. Appl. Phys.*, 21, 79 (1950); Chem Eng. Prog., 46, 585 (1950), demonstrated the feasibility of separating oxygen from air and described practical processes for separation of hydrogen and helium from methane. Although their results were highly valuable in the development of the science of membrane separation, the calculated membrane area requirements for industrial processes were enormous.

The technical breakthrough in the application of membranes to gas separation came with the development of a process for preparing cellulose acetate membranes in a state which retains the permselective characteristics of ordinary cellulose acetate but which yields vastly increased gas permeability. These cellulose acetate membranes are prepared from a solution of the polymer which is cast on a smooth surface then set or gelled in an ice-water bath. At this stage the membranes are heated in water to improve their selectivity characteristics and are then dried by a solvent exchange technique. The reason for the high permeability values, together with the permselective characteristics of ordinary cellulose acetate, is the formation of an "active" layer on the air-dried surface of the membrane. This active layer has characteristics similar to those of ordinary cellulose acetate and has a thickness of the order of 0.2 micrometers ($\mu$m) or less, whereas the total membrane thickness may range from approximately 75 to 125 $\mu$m. Thus, the membranes are said to be asymmetric. The major portion of the membrane is an open-pore sponge-like support structure through which gases may flow freely. The permeability and selectivity characteristics of these membranes are functions of casting solution composition, film casting conditions, and post-treatment and are relatively independent of total membrane thickness.

Membranes made for gas separation from cellulose acetate, or any other brittle polymer, are difficult to handle in large pieces due to their propensity to crack when in the dry state. This difficulty may be overcome partially by casting the membrane on a fabric support. The current technology for reverse-osmosis (R.O.) membranes utilizes a Dacron polyester cloth support in order to meet the requirement of high wet strength for water desalination. However, R.O. membranes are stored wet or are manufactured with an aqueous fugitive plasticizer. Neither the wet, nor the plasticized membrane are capable of gas separation. The Dacron fabric utilized in the R.O. membrances, however, exhibits very low shrinkage during the membrane processing with the result that when dried the membrane curls extensively along the edges due to the large difference in shrinkage between the membrane and the fabric. This curling makes it very difficult to fabricate gas separation spiral elements without incurring wrinkles in the membrane and cracking along the edges.

SUMMARY OF THE INVENTION

It has now been discovered in accordance with this invention that gas separation membranes can be fabricated that do not curl, crinkle or crack by casting the membrane onto a fabric that is shrinkable during the subsequent processing steps of heating, solvent exchange and drying. The fabric-supported membrane exhibits comparable selectivity and permeation rates to free standing or prior fabric-supported membranes. The fabric-supported membrane of this invention can be handled, stored or spirally wound into a gas separation element without concern for cracking, curling or peeling.

These and many other features and attendant advantages of the invention will become apparent as the invention becomes better understood by reference to the following detailed description when considered in conjunction with the accompanying drawings.

DESCRIPTION OF THE PREFERRED EMBODIMENTS

Figure 1:
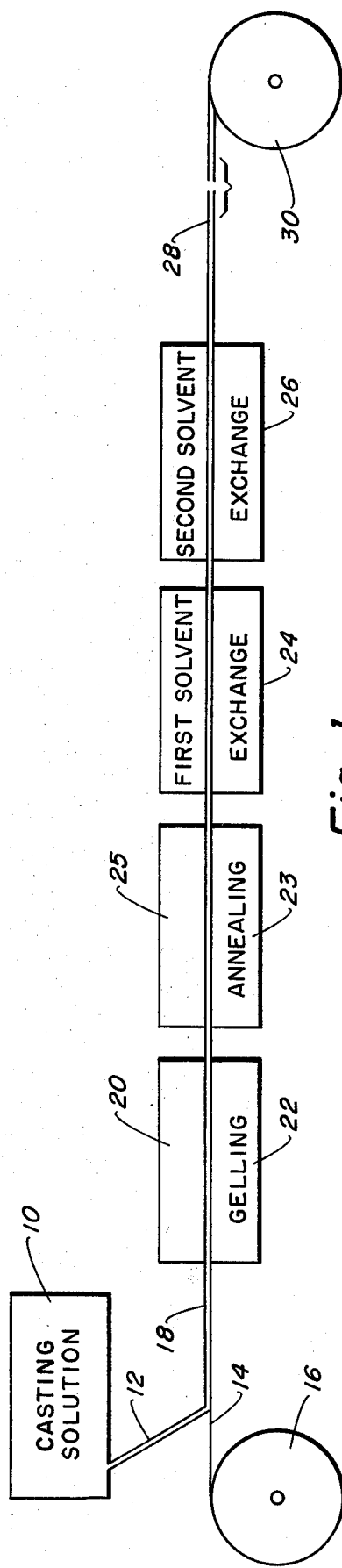
FIG. 1 is a block and diagrammatic view of the process of the invention.

The invention is generally applicable to membranes formed from solutions of polymers that shrink after casting into brittle membrane films and particularly to cellulose esters of alkanoic acids containing 1 to 10 carbon atoms or mixtures thereof. The membrane casting solutions utilized for preparation of wet reverse osmosis membranes are generally applicable to forming the dry gas separation membranes of this invention such as those disclosed in U.S. Pat. No. 3,497,072, the disclosure of which is incorporated herein by reference.

Preferred membranes are formed from cellulose acetate. The acetyl content of the membrane is generally in the range of 36% to 44% by weight, preferably from 41% to 43%. This acetyl range can be readily achieved by blending a commercially available cellulose diacetate (38–40% acetyl) with a cellulose triacetate (42–44% acetyl) in the range of 3:1 to 1:3 diacetate to triacetate.

The solvent is utilized in the casting solution in an amount necessary to provide a workable casting solution. Typically the solvent is present in an amount of 30 to 80 parts by weight per each 10 parts of cellulose ester. The choice of solvent depends on the cellulose ester employed. The solubility of cellulose acetate in organic solvents changes progressively with changes in chemical composition. Cellulose acetates having acetyl contents in the range of 38–40% are readily soluble in typical medium polarity solvents such as acetone, methyl ethyl ketone, methyl acetate, ethyl lactate, and 1,4-dioxane. Cellulose acetate compositions having high acetyl contents such as the commercially available cellulose triacetates are soluble in a few specific solvents such as tetrachloroethane, methylene chloride and methylene chloride/methanol solutions. The triacetate material is also soluble in acetone-1,4-dioxane mixtures and in one preferred method of fabrication, the cellulose triacetate is first dissolved in an acetone-dioxane solution through an overnight agitation. Following which the desired amount of cellulose diacetate is added and the agitation continued until the diacetate goes into solution.

the casting solution also contains 0-2 parts of a solvating agent such as water, methanol or ethanol for each 10 parts of cellulose ester and 0.5-5 parts of a swelling agent per each 10 parts of cellulose esters. The swelling agent can be an inorganic salt, such as disclosed in U.S. Pat. Nos. 3,133,132 and 3,133,137, mineral acids such as perchloric acid or phosphoric acid as disclosed in U.S. Pat. No. 3,444,286, or certain organic compounds such as maleic acid, tartaric acid, citric acid and malonic acid as disclosed in U.S. Pat. No. 3,673,084. The preferred formulation containing the mixed diacetate-triacetate and mixed acetone-dioxane solvent utilizes methanol as the solvating agent and maleic acid as the swelling agent.

The fabric support is a flexible, tough, gas permeable fabric which may be a woven or non-woven fabric. The fabric contains pores which allow penetration of the viscous casting solution to a depth of at least 10% of the thickness of the fabric to provide anchoring of the membrane but which do not allow flow of the casting solution to the rear surface since this would cause excessive permeate back pressure. Usual penetration of the membrane into the pores of the fabric should be in the range of 20 to 40% of the thickness of the fabric.

The fabric must be capable of shrinking during the membrane casting processing steps to within ±30% of the amount of shrinkage of the membrane. The most suitable materials are synthetic fabrics woven from fabric grade filaments such as polyesters or nylons (polyamides). The polyesters are generally polyethylene terephthalates (Dacron). The nylons can be copolymers of dibasic organic acids with diamines of homopolymers of lactams or amino alkanoic acids.

Common nylon designation are presented in the following table.

| Designation | Chemical Basis |
| --- | --- |
| Nylon-6/6 | Hexamethylene diamine-adipic acid |
| Nylon-6/10 | Hexamethylene diamine-sebacid acid |
| Nylon-6 | Polycaprolactam |
| Nylon-11 | 11-aminoundecanoic acid |
| Nylon-6/12 | Hexamethylene diamine-dodecanoic acid |
| Nylon-12 | Laurolactam |

The polymers are usually extruded into filament, sized and woven into fabric. The fabric off the loom is in a dimensionally unstable, shrinkable form termed "griege goods" in the fabric industry. Industrially, griege goods are finished by scouring to remove the sizing and hot calendering to shrink the filaments. Finished, commercial fabrics exhibiting substantially no shrinkage are unsuitable for use in the present invention.

The thickness of the fabric is not significant; the minimum thickness being sufficient to provide a structural support for the membrane, maximum thickness being determined by cost and bulkiness of the spiral element. The thickness of the fabric is usually from 0.003-in. to 0.020-in. The denier and warp and fill count are related only to gas permeability and casting surface and can be widely varied.

The improved fabric-supported gas separation membrane is fabricated by the steps of casting a solution of the membrane onto the fabric, gelling the membrane, annealing the membrane and drying the membrane. Certain membranes such as polysulfones can be air dried. Cellulose ester membranes are dried by solvent exchange to prevent the membrane from excessive shrinkage and to prevent the membrane from losing its permselective characteristics which would occur if the water is allowed to directly evaporate. Annealing is a process in which the membrane structure tightens and its selectivity for gas separation increases. Annealing may occur partially or completely during solvent exchange or may be conducted by a separate heat treatment before solvent exchange drying.

Solvent exchange drying can be conducted by a multiple stage technique by displacing the water with a water-miscible solvent which is a non-solvent for the membrane and fabric such as a lower alkanol followed by displacement of the miscible solvent with a non-miscible solvent. The non-miscible solvent can be a hydrocarbon or chlorinated hydrocarbon aliphatic or aromatic solvent, preferably aliphatic solvents such as hexane or carbon tetrachloride.

Referring now to FIG. 1, the casting solution from reservoir 10 is fed by a suitable device such as a hollow doctor blade 12 onto fabric support 14 supplied from supply roll 16 to form a film 18 of suitable thickness. The film penetrates about ⅓ the thickness of the fabric into the interstices between the warp and fill filaments. A brief evaporation occurs before the coated fabric enters the gelling tank 20 containing cold water 22. The water is suitably at a temperature of from 0° C. to about 10° C. For an acetone-dioxane casting solution, the temperature is preferably maintained at about 0°-3° C. The cast film, which at the stage of manufacture has a swollen gel structure, is next appealed to provide greater selectivity in gas separation in annealing tank 23 which contains hot water 25 at a temperature of about 70° C. up to about 100° C. suitably about 85° C. The membrane is suitably annealed for several minutes and then dried by a two-step solvent exchange in an isopropanol bath 24 followed by a hexane bath 26 before air drying 28 and wind-up onto driven wind-up roll 30.

Figure 2:
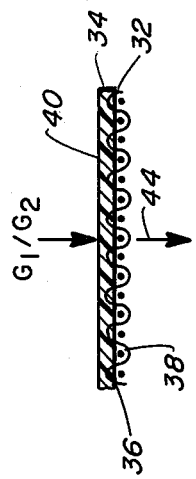
FIG. 2 is a cross-sectional view of the fabric-supported membrane.

As shown in FIG. 2, the final supported membrane comprises a shrunken fabric support 32 on which is supported a selectively-permeable, gas separation membrane film 34 having portions thereof 36 penetrating into the warp-fill interstices 38 of the fabric. During the processing in the annealing, solvent exchange and air drying steps, the membrane and the fabric will both shrink a controlled amount to provide an integral assembly not subject to curling, cracking or peeling. Further, as shown in FIG. 2, gas separation is achieved by flowing a gas mixture $G_1/G_2$ having a first ratio of the more permeable gas, $G_1$, to the less permeable gas, $G_2$, past the surface 40 of the membrane and recovering on the obverse side 44 of the membrane a gas mixture having a higher ratio of the more permeable gas, $G_1$, to the less permeable gas, $G_2$.

Figure 3:
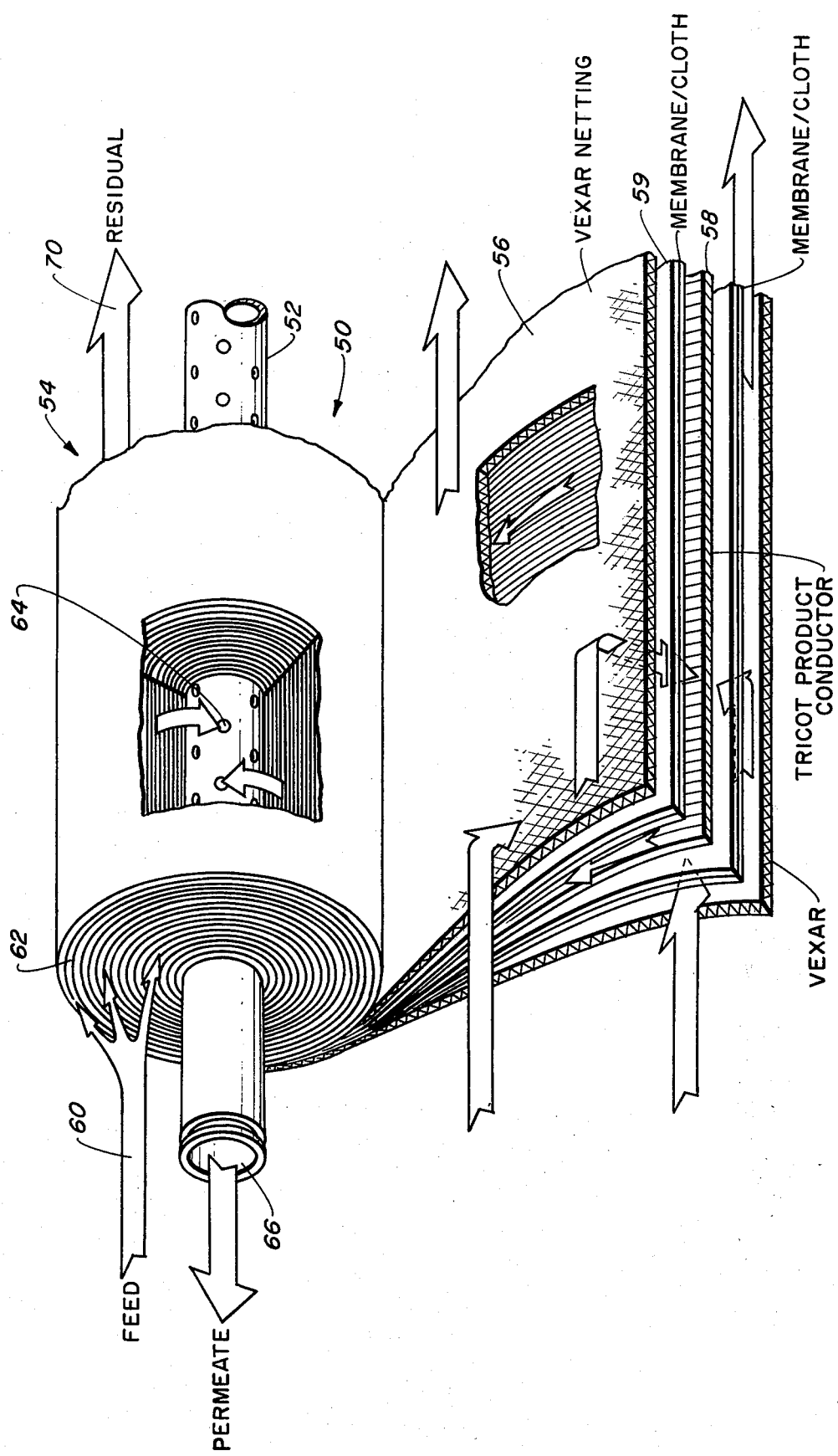
FIG. 3 is a perspective view partially in section of a spirally wound gas separation element incorporating the membrane of this invention.

The fabric-supported membranes of the invention can readily be fabricated into spiral wound gas separation elements as shown in FIG. 3. The element 50 comprises a perforated hollow core member 52 on which is would a mutilayer spiral 54. The spiral layer 54 comprises a stiff netting layer 56 forming a feed channel and a gas conductor layer 58 permeable to gas in the lateral direction, sandwiching the fabric-supported membrane layer 59. The gas mixture 60 is fed to the side 62 of the spiral 54 and enters the netting layers 56. A gas mixture enriched in the more permeable gas component of the feed 60 will penetrate the membrane cloth assembly 59, will be spirally conducted through the gas conductor layer 58 to the perforated core 52, will enter pores 64 and will leave through outlet 66 as permeate. The residual gas stream 70 will flow across the netting layer 56 and can be collected on the opposite side of the spiral element 54 from the feed side.

The gas membranes described can be utilized to separate gas mixtures such as hydrogen from methane, hydrogen from carbon monoxide, hydrogen from nitrogen or oxygen from nitrogen, as long as the separation factor, $\alpha$, exceeds 1. The separation factor is defined as the ratio of the permeability of the more permeable gas to the permeability of the less permeable gas and is preferably above 5 and most preferably above 30. The recovery of the enriched gas mixture depends on the pressure ratio, gas composition, separation factor and pressure differential. All these relationships are well known in the art. In terms of economics, the two most important factors are compression power and membrane area. Because they are inversely proportional to each other, there is an optimum operating scheme for a given set of conditions which must be determined for each separation of interest. A specific example of practice follows:

EXAMPLE 1

A casting solution was prepared from the following ingredients:

| Component | Parts by Wt. |
| --- | --- |
| Cellulose diacetate (39.8% acetyl) | 10 |
| Cellulose Triacetate (43.5% acetyl) | 10 |
| Acetone | 60 |
| Dioxane | 20 |
| Methanol | 9 |
| Maleic acid | 3 |

The casting solution of Example 1 was cast onto commercial, finished Dacron and nylon griege fabrics. A production lot of the casting solution composition of Example 1 was cast on each of the cloths in a five inch wide strip on a laboratory casting machine to a thickness of 0.010 inches. A free standing membrane was also cast five (5) inches wide on aluminized Mylar. The resulting membranes were gelled in ice water and heat treated in water at 85° C. for several minutes and then dried by a two-step solvent exchange procedure in isopropanol and hexane before air drying to evaporate the hexane. The shrinkage was noted for all four membranes after casting and gelation, after the heat treatment and after solvent exchange and air drying. These data are presented in Table 1.

TABLE I
SHRINKAGE OF CELLULOSE ACETATE MEMBRANES

| Casting Condition | % Shrinkage From Original Width | | |
| --- | --- | --- | --- |
| | After Casting | After 85° C H.T. | After Solvent Exchange and Dry |
| Free-standing membrane | −2.5 | −5 | −7.5 |
| Dacron D601; Travis Mills, scoured and calendered | 0 | 0 | −0.6 |
| Dacron 0714, Texlon Corp., griege goods | 0 | −2.5 | −2.5 |
| Nylon 1031, Texlon Corp., griege goods | −1.3 | −5 | −7.5 |

Nylon 1031 griege goods in a type 6/6 200 denier yarn having a warp-fill count of 64 × 52, a thickness of 0.008 inches and weighing 33 oz/sq.yd.

It was observed that the free-standing membrane shrinks approximately equal amounts through each step for a total shrinkage of 7.5%. This means that for a cast-on-fabric membrane to remain perfectly flat after drying, the cloth must also shrink by 7.5% during the process. Dacron D601 is the standard cloth (after scouring and hot-calendering) used for reverse-osmosis membrane casting. It can be seen that essentially no shrinkage was observed, explaining the great extent of curling found when these membranes are dried. Dacron 0714 griege goods is a water-loomed cloth that has not been scoured to remove the sizing and has not been calendered. The total shrinkage of this cloth amounts to only 2.5%, which decreased membrane curling. The Nylon 1031 in the griege state exhibited the same shrinkage as the free-standing membrane and provided the best fabric-supported membrane.

The membranes shown in Table 1 were tested in duplicate for gas permeation properties and were compared to cast-on-fabric production membrane made from the same casting solution. The resulting data are shown in Table 2.

TABLE 2
PERMEATION DATA FOR CELLULOSE ACETATE MEMBRANES CAST ON VARIOUS CLOTHS

| Casting Condition | Permeation Rate, He, SCFH/ft² · 100 psi | Separation Factor, $\alpha$ (He/N$_2$) |
| --- | --- | --- |
| Dacron D601, Production cast | 10.3 | 53 |
| Free-standing, Lab cast | 14.5 | 36 |
| Dacron D601, Lab cast | 26 | 29 |
| Dacron 0714, Lab cast (griege goods) | 21 | 29 |
| Nylon 1031, Lab cast (griege goods) | 18.3 | 26 |

This comparison points out that none of the membranes cast on the laboratory casting machine had as high a separation factor as the production cast membrane. By comparing only those membranes cast on the laboratory casting machine, however, it can be seen that there was little difference in separation factor between the free-standing membrane and the various cast-on-fabric membranes.

Four rolls of 9-in. wide Nylon 1031 griege goods were cast on the production casting machine at various conditions of casting speed, drying time and membrane thickness, with membrane casting solution in Example 1. Based on helium permeation rates and the He/N$_2$ separation factor of samples from these rolls it was determined that the best casting conditions were: 10 ft/min casting speed, 6 sec drying time and a 0.010-in. casting thickness. A full-width (39.25-in.) roll 30 yds long was then cast under these conditions. The membrane was heat-treated at 85° C. and solvent-exchanged samples were measured for shrinkage, gas permeation rates and curling. The results of these measurements are shown in Table 3, along with free-standing membrane data and Dacron cloth-cast membrane data. The values shown are the average of 12 samples.

TABLE 3

PROPERTIES OF CELLULOSE ACETATE MEMBRANE CAST UNDER VARIOUS CONDITIONS

|  | Free-Standing | Dacron 601 Cloth | Nylon 1031 Cloth |
|---|---|---|---|
| Shrinkage, %, from before casting to after drying | 7.5 | 1.0 | 7.0 |
| Permeation Rate, He, SCFH/ft² 100 psi | 16.4 | 10.3 | 14.1 |
| Separation factor, α(He/N₂) | 62 | 53 | 60 |

It may be seen from Table 3 that the membrane cast on Nylon griege goods compares favorably with both Dacron cloth cast and free-standing membrane in terms of permeation properties and exhibits about the same shrinkage as free-standing membrane. These results show that membrane cast on Nylon cloth is equivalent in gas separation properties to the membrane cast on Dacron cloth. Several large pieces of membrane (3-ft by 7-ft) were air dried without solvent exchanging as a more critical test of shrinkage (air-drying causes greater membrane shrinkage than solvent exchanging). It was found that the pieces remained flat and could be easily handled for fabricating spiral elements. These results indicate the excellent properties for this cloth in the production of gas separation elements. Other shrinkable cloths could be used in the invention, for example, Travis Mills produces 2 nylons, 5030 and 5031, that exhibit ~5% shrinkage under identical conditions.

It is to be realized that only preferred embodiments of the invention have been described and that numerous substitutions, modifications and alterations are permissible without departing from the spirit and scope of the invention as defined in the following claims.

What is claimed is:

1. A gas separation composite membrane comprising:
   a polymeric, permselective membrane exhibiting a percentage shrinkage from casting through removal of solvent, attached to
   a flexible, synthetic gas permeable, woven, griege goods fabric support exhibiting a percentage shrinkage during casting of the membrane differing from that of the membrane by no more than ±30% and the membrane is anchored to the fabric support and penetrates into the pores of a fabric to a depth of 10% to 40% of the thickness of the fabric.

2. A membrane according to claim 1 in which the polymer is a cellulose ester.

3. A membrane according to claim 1 in which the cellulose ester is cellulose acetate having an acetyl content from 36% to 44%.

4. A membrane according to claim 3 in which the fabric is shrinkable polyester or polyamide.

5. A membrane according to claim 1 in which the fabric is a polyamide.

6. A membrane according to claim 5 in which the polyamide is nylon-6/6.

7. A gas separation element comprising:
   a perforated core member receiving;
   a spirally would multilayer assembly in which the membrane as defined in claim 1 disposed between a netting layer and a gas conductor layer.

8. A co-shrunk, fabric-supported gas separation membrane comprising a polymeric, permselective gas separation membrane exhibiting a percentage shrinkage from casting through removal of solvent cast onto and anchored to a flexible, synthetic, gas permeable, dimensionally stable, griege goods fabric by penetration of the membrane into the pores of the fabric to a depth of 10% to 40% of the thickness of the fabric, the shrunk fabric dimension differing from a dimension of a free-standing membrane by no more than ±30%.

9. A method of separating gases comprising the steps of:
   feeding a gas mixture to a first side of the membrane defined in claim 1;
   permeating a portion of the mixture through the membrane; and
   recovering a gas permeate from the obverse side of the membrane and residual from the first side of the membrane.

10. A method according to claim 9 in which the membrane is in spiral form and the permeate is conducted to the center of the spiral for recovery.

* * * * *

UNITED STATES PATENT AND TRADEMARK OFFICE
CERTIFICATE OF CORRECTION

PATENT NO. : 4,134,742
DATED : 1-16-79
INVENTOR(S) : William John Schell

It is certified that error appears in the above-identified patent and that said Letters Patent are hereby corrected as shown below:

Column 1, before "Background of the Invention" insert

-- The Government has rights in this invention pursuant to Contract No. EX-76-C-01-2000 awarded by the U.S. Department of Energy.--

Signed and Sealed this

Nineteenth Day of August 1980

[SEAL]

Attest:

SIDNEY A. DIAMOND

Attesting Officer

Commissioner of Patents and Trademarks